United States Patent
Hwang

(10) Patent No.: US 8,959,345 B2
(45) Date of Patent: Feb. 17, 2015

(54) ELECTRONIC READING POSITION MANAGEMENT FOR PRINTED CONTENT

(71) Applicant: Audible, Inc., Newark, NJ (US)

(72) Inventor: Douglas C. Hwang, New York, NY (US)

(73) Assignee: Audible, Inc., Newark, NJ (US)

( * ) Notice: Subject to any disclaimer, the term of this patent is extended or adjusted under 35 U.S.C. 154(b) by 159 days.

(21) Appl. No.: 13/662,321

(22) Filed: Oct. 26, 2012

(65) Prior Publication Data

US 2014/0118800 A1    May 1, 2014

(51) Int. Cl.
| | |
|---|---|
| *H04L 29/06* | (2006.01) |
| *H04N 1/00* | (2006.01) |
| *G06F 17/30* | (2006.01) |
| *G06F 15/02* | (2006.01) |

(52) U.S. Cl.
CPC ............ *H04N 1/00795* (2013.01); *G06F 17/30* (2013.01); *H04N 1/00331* (2013.01); *H04N 2201/0084* (2013.01); *G06F 15/0291* (2013.01)
USPC .......................................................... 713/168

(58) Field of Classification Search
CPC .. H04N 1/00331; G06F 17/30; G06F 15/0291
USPC .......................................................... 726/26
See application file for complete search history.

(56) References Cited

U.S. PATENT DOCUMENTS

| | | | |
|---|---|---|---|
| 2006/0011728 A1 | 1/2006 | Frantz et al. | |
| 2007/0013680 A1 | 1/2007 | Yeung et al. | |
| 2007/0298399 A1* | 12/2007 | Shao et al. | 434/317 |
| 2010/0042702 A1* | 2/2010 | Hanses | 709/219 |
| 2013/0151954 A1* | 6/2013 | Ierullo | 715/254 |

* cited by examiner

*Primary Examiner* — Mohammad W Reza
(74) *Attorney, Agent, or Firm* — Knobbe, Martens, Olson & Bear, LLP

(57) ABSTRACT

Features are disclosed for facilitating content consumption among various formats or representations of a content item. An electronic device may be used to maintain a current content position when consuming a physical printed representation of a content item, either alone or in conjunction with an electronic representation of the content item. The electronic device may be used to retrieve, from a network-accessible server, a user's last position within the content item. The user may then turn to the location within the physical printed representation that corresponds to the last position within the electronic representation. Highlights, comments and other content interactions may be maintained by the electronic device and stored at the network accessible server. From there, content interaction data may be subsequently obtained by the user when resuming content consumption, either from the same device or a different device.

30 Claims, 11 Drawing Sheets

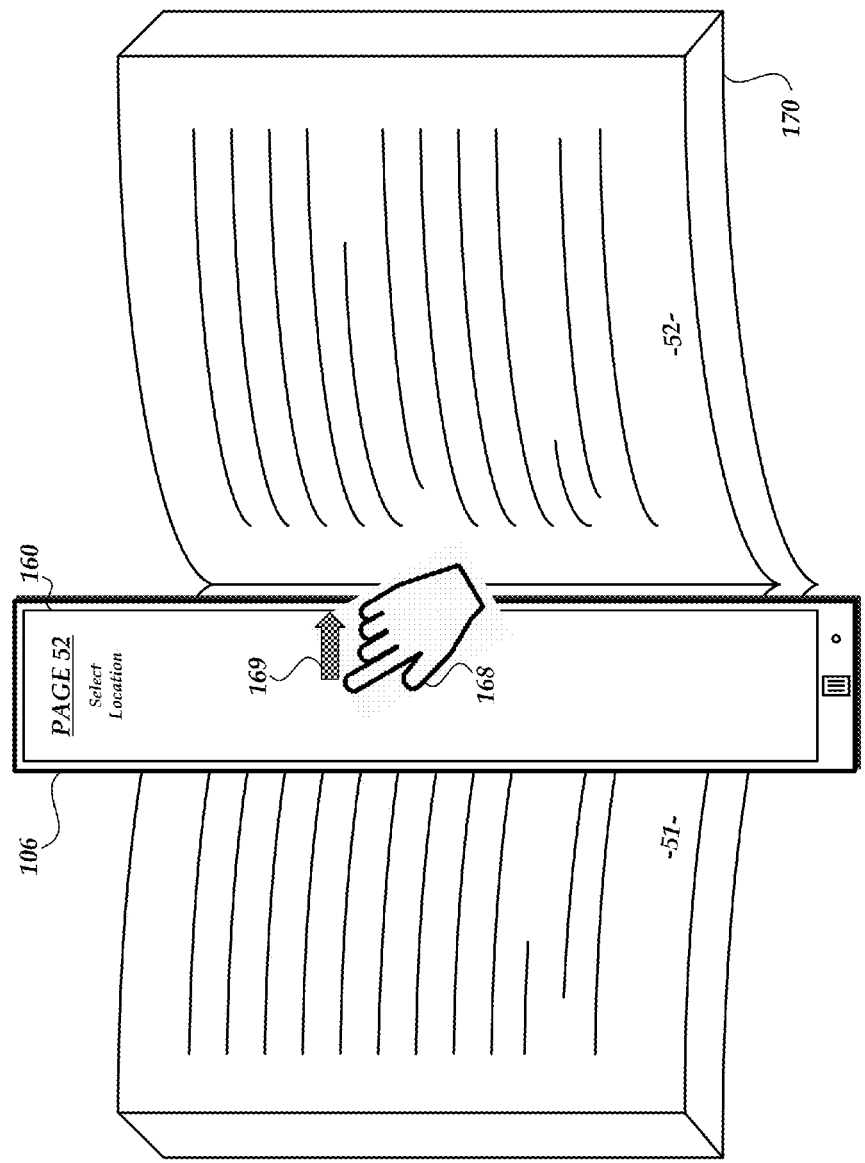

ELECTRONIC READING POSITION MANAGEMENT FOR PRINTED CONTENT

BACKGROUND

Computing devices, including personal and mobile devices, may be used to read books and other textual content, and to listen to audio books and other aural content. The content consumed on such computing devices, whether in visual or audio format, may be electronic representations of content with a corresponding physical representation, such as a printed book, magazine, newspaper, or the like. In one application, various computing devices associated with a user or a user account have access to different representations of the content provided by content providing entities. For example, a user may be associated with a wireless computing device corresponding to an electronic book reader ("ebook reader") that has obtained a digital representation of content (e.g., a digital publication that can be presented on an ebook reader) via a communication network (e.g., a wireless communication network). The same user may also be associated with a personal computing device that has obtained a separate representation of the same content (e.g., a copy of the digital publication that can be presented on a display associated with the ebook reader) via the same or a different communication network. In addition, the user may be associated with a digital audio player that has also obtained a separate representation of the same content (e.g., an audio book that can be audibly presented via headphones/speakers) from the same or a different communication network. Still further, the user may also be associated with a physical representation of the same content (e.g., a printed book).

Depending on the capabilities and functionality associated with each respective device and the specific nature of the content, a user accesses content via a presentation interface provided, or otherwise associated, with a specific device (e.g., a display on a wireless ebook reader device). In some devices, the user can provide, or associate, additional information with the content, such as annotations, bookmarks, excerpts, etc., during the presentation of the content on a specific device. However, the state/progress of the presentation of the specific representation of the content at any one of the specific devices, as well as any additional information provided by the user during the presentation, is not readily provided to the user while consuming a copy of the content in non-electronic format (e.g., a physical book).

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 2D is a diagram of the illustrative device of FIG. 2A showing the input of the current content position.

DETAILED DESCRIPTION

Introduction

Figure 1:
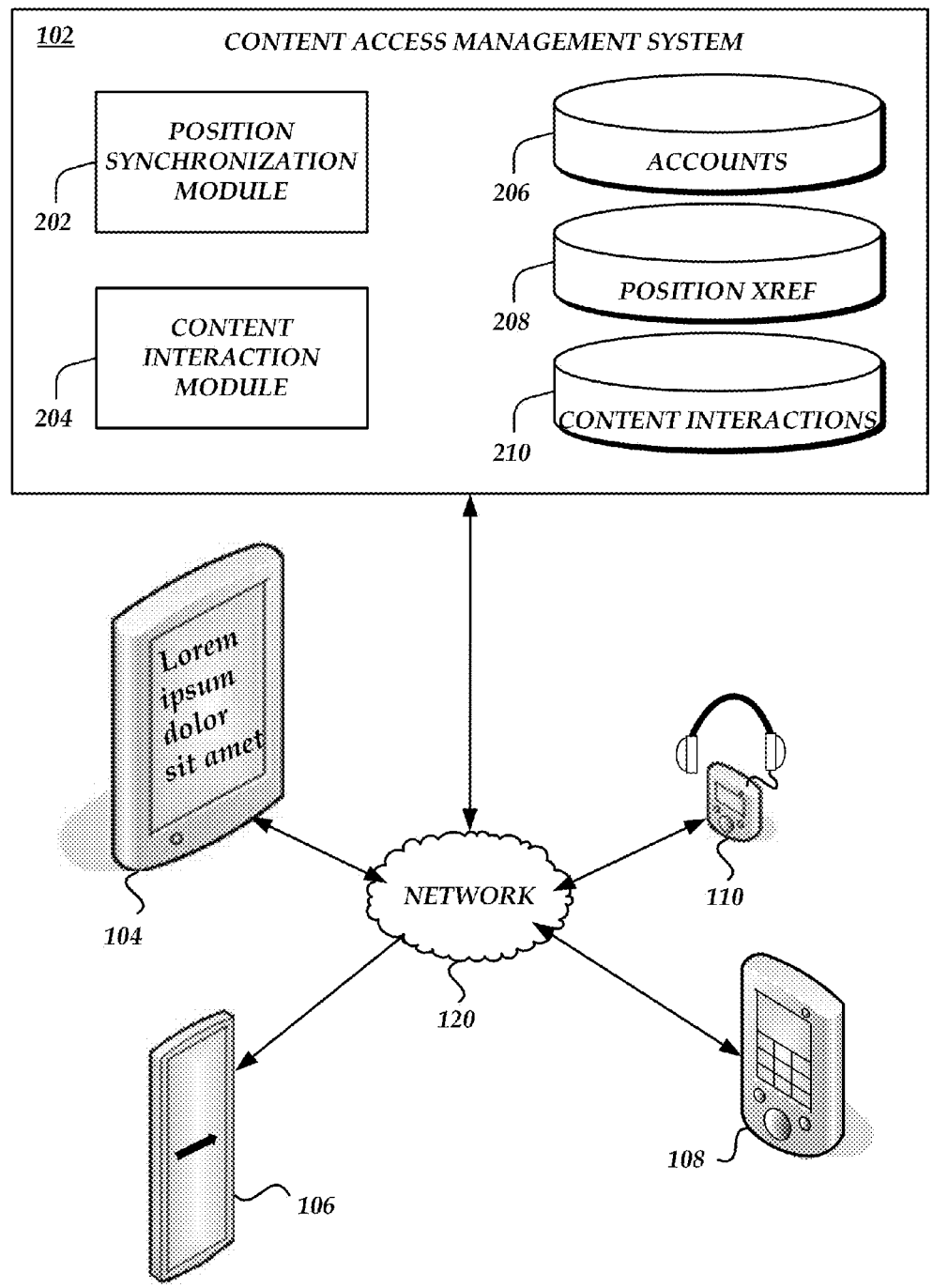
FIG. 1 is a block diagram of an illustrative networked content consumption environment including several devices for tracking content consumption and a content access management system.

Generally described, the present disclosure relates to consumption of physical printed representations and electronic representations of a content item. Aspects of the present disclosure relate to the use of an electronic device for maintaining a current content position when consuming a physical printed representation of a content item, either alone or in conjunction with an electronic representation of the same content item. For example, a user may begin consuming an electronic representation of a content item (e.g., an ebook or audio book) and later wish to resume content consumption with a physical printed representation (e.g., a hardbound or softbound book) of the content item. An electronic device (e.g., a mobile phone or a purpose-built device, such as an electronic bookmark) may be used to retrieve, from a network-accessible server, the user's last position within the content item. The server may be programmed to convert or translate the position from one format to another in order to provide an accurate position regardless of which format is currently being consumed (e.g., from a progress indication associated with an electronic format to a page number associated with a physical printed format). The user may then turn to the location within the physical printed representation that corresponds to the last position within the electronic representation. When the user wishes to stop reading the physical printed representation, the user may submit the current position to the server via the electronic device. When the user next desires to resume consuming the content item, the position may again be retrieved via the electronic device or, if the user desires to resume with an electronic representation of the content, via an electronic consumption device (e.g., an ebook reader).

Additional aspects of the present disclosure relate to submission and retrieval of highlights, comments, annotations and other content interactions associated with the content item. For example, a user may annotate an ebook while consuming it on an ebook reader. Annotations may be submitted to a network-accessible server for storage and distribution to other content consumption devices and computing devices associated with the user. When subsequently consuming a physical printed book, the user may access those annotations via an electronic device, in a manner similar to accessing the current content position. In addition, the user may create and submit annotations via the electronic device while reading the physical printed book so that the annotations may be available later when the user resumes content consumption with the ebook reader, an audio player, a different copy of the physical printed book, etc.

Although aspects of the embodiments described in the disclosure will focus, for the purpose of illustration, on features provided by a central content access management system in conjunction with a personal computing device or purpose-built device, one skilled in the art will appreciate that the techniques disclosed herein may be applied to any number of devices and/or software processes or applications. Further, although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

With reference to an illustrative example, a user may consume content, such as a book, magazine, newspaper, or some other content, in a number of different formats. For example, a user may consume *The Adventures of Tom Sawyer* as an ebook, an audio book and as a printed book. The user may listen to the book in audio book format while driving, and may read the ebook or printed book at other times depending on the location, convenience to the user and other usability factors. As a user listens to the audio book or reads the ebook, data regarding the user's position within the book (e.g., an elapsed playback time of the audio book, or an index position of the ebook) may be transmitted to a content access management system. The management system may store the position data or process it into a format-agnostic position indicator for storage and access from different devices. In addition, the user may highlight passages and add annotations to the ebook, or add audio comments to the audio book. Data regarding these and other content interactions may also be transmitted to the content access management system for storage and access from different devices.

Users typically consume ebooks, audio books, printed books, and other lengthy content items over the course of multiple consumption sessions. For example, the user may begin consuming *The Adventures of Tom Sawyer* with an audio book, as described above, and stop after a period of time. The user may wish to resume consumption with a physical printed copy of *The Adventures of Tom Sawyer*. While ebooks and audio books, and the devices used to consume them, may keep track of the user's last position within the respective copies of the content, many ebooks and audio books do not indicate a page number or some other position that can be used to locate the corresponding content position within a printed copy. In addition, some content items, such as *The Adventures of Tom Sawyer*, are available in many different printed versions (e.g., various hardbound and softbound versions from different publishers), and each version may incorporate different pagination. Further, the user may not have access, at the time the user wishes to resume consumption with a printed copy, to the device on which the audio book or ebook was last consumed. The user may utilize an electronic device, such as a purpose-built electronic bookmark, to access current position data and resume reading *The Adventures of Tom Sawyer* with a printed copy at the same location the user left off in an audio book or ebook version.

The electronic bookmark may access the content access management system via a network connection, such as a wireless connection to the internet, and submit user account data and an indicator corresponding to the printed copy of *The Adventures of Tom Sawyer* that the user wishes to read. The indicator may be obtained by scanning a barcode on the printed copy, keying in a title or code, speaking a voice command, performing character recognition on a portion of the text, etc. The content access management system can determine whether the user has a valid account, and if so, determine a position within the user's printed copy that corresponds to the last position received from a device associated with the user. For example, the user may have last listened to an audio book of *The Adventures of Tom Sawyer* and stopped playback at a particular elapsed time (e.g., one hour, forty five minutes, thirty two seconds). The content access management system may access a cross-reference database, third party service, or some other means of converting the elapsed time into a page number for the user's printed copy. If the content access management system is successful, the page number may be transmitted to the electronic bookmark, where it is displayed visually or indicated aurally. In some embodiments, more specific location information may be available, such as the paragraph, sentence, or vertical position on the indicated page that corresponds to the elapsed time of the audio book. Such information may also be presented via the electronic bookmark, and the user may use the presented information to locate the specific position on the page.

Annotations, comments, highlights and other content interactions by the user (or by other users) may be received in similar fashion, and presented to the user visually (e.g., via a display embedded into or associated with the electronic bookmark) or aurally (e.g., via text-to-speech software). The user may wish to highlight portions of text, add comments and otherwise interact with the content while reading the printed copy. By using the electronic bookmark to record the content interactions, they may be saved and made available to the user when the user subsequently consumes the content in other formats. For example, the user may key in a comment or record a spoken comment with the electronic bookmark.

When the user wishes to stop reading the printed copy, the user may submit the current position to the content access management system so that the user may resume the content in any desired format at a later time. For example, the user may utilize a camera or scanner of the electronic bookmark to input the page number, key the page number in, scan a page of the text or speak a voice command. The user may also indicate a specific location on the page in a similar manner. Data regarding the position within the printed copy may then be transmitted to the content access management system, such as via a wireless internet connection.

In some embodiments, the user may access the features described above or other similar features via a different device, such as a mobile phone, media player, or portable gaming system. For example, a mobile phone may provide a camera or scanner to submit book indicators and page locations, a display for presenting position data and user content interactions, a microphone for submitting voice commands, a speaker for presenting data aurally and a number of other input or output components commonly included with mobile phones. The features may be provided as a stand-alone software module that is installed on the mobile phone. In addition, a mobile phone may provide different hardware and software capabilities that are not available to an electronic bookmark (e.g., faster processor, larger display), and such capabilities may be used to provide the features described above and other features in a different manner.

Networked Content Consumption Environment

Prior to describing the electronic bookmark and other embodiments in detail, an example networked content consumption environment in which the features may be implemented will be described. FIG. 1 illustrates a networked content consumption environment including a content access management system 102 and various user devices 104-110 communicating over a communication network 120. The communication network 120 may be any wired network, wireless network, or combination thereof. In addition, the network 120 may be a personal area network, local area network, wide area network, cable network, satellite network, cellular telephone network, or combination thereof. For example, the communication network 120 may be a publicly accessible network of linked networks, possibly operated by various distinct parties, such as the Internet. In some embodiments, the communication network 120 may be a private or semi private network, such as a corporate or university intranet. The communication network 120 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The user devices 104-110 can correspond to a wide variety of electronic devices. In some embodiments, one or more user devices 104-110 are mobile devices that include one or more processors and a memory which may contain software applications executed by the processors. User devices 104-110 may include speakers and/or displays for presenting content. In addition, the user devices 104-110 may be configured with one or more wireless network antennae or wired ports to facilitate communication with other devices and with the shared consumption management system 102. The software of the user devices 106 may include components for establishing communications over the communication network 120. In addition, the software applications may include multimedia applications which play or otherwise execute audio programs such as music or audio books, video programs such as movies or television shows, and video games. As illustrated in FIG. 1, the user devices may include a tablet computing device or electronic book reader 104, an electronic bookmark 106, a mobile phone 108, or a personal audio player 110. However, those skilled in the art will recognize that user devices may also include, without limitation, laptop computers, personal computers, personal digital assistants (PDAs), hybrid PDA/mobile phones, set-top boxes, cameras, digital media players, video game consoles, kiosks, televisions, gaming devices, processors, integrated components for inclusion in computing devices, appliances, electronic devices for inclusion in vehicles, gaming devices, etc.

The content access management system 102 illustrated in FIG. 1 may correspond to a computing device configured to manage content consumption among the user devices 104-110. For example, the content access management system 102 may include one or more processors and a computer storage or memory which contains software applications or modules executed by the processors. The services provided by the content access management system 102 can include receiving data regarding the current content position on individual user devices, determining a current content position for one version of the content (e.g., an audio book) from a position associated with a different version of the same content (e.g., a printed book), and maintaining a single set of highlights and other content interactions for a user regardless of the specific version with which the content interaction was originally associated.

In some embodiments, the content access management system 102 may correspond to a logical association of one or more computing devices, such as an application server for converting content consumption positions, and a database server for storing data regarding users, content positions, content interactions and the like. In some embodiments, the features and services provided by the content access management system 102 may be implemented as one or more web services consumable via the communication network 120. In further embodiments, the content access management system 102 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the networked content consumption environment may include additional or fewer components that those illustrated in FIG. 1. For example, the networked content consumption environment may include two or more content access management systems 102 configured for load balancing, redundancy, or to operate independently of each other. As another example, the networked content consumption environment may not include a separate content access management system 102. Rather, the features of the content access management system 102 may be implemented by a user device, such as a desktop computer, that is also used to consume content and submit content interactions.

The content access management system 102 may execute a position synchronization module 202 and a content interaction module 204. In addition, the content access management system 102 may include an accounts data store 206, a content position cross-reference data store 208 and a content interactions data store 210. Each module of the content access management system 102 may be implemented on a separate computing device, such as a server computing device, or one or more of the modules may be implemented on the same computing device. In addition one or more of the data stores 206-210 may be remote from the content access management system 102 and/or may be implemented as a web service itself. In some embodiments, the content access management system 102 may include additional or fewer modules and/or data stores than those illustrated in FIG. 1.

The position synchronization module 202 can obtain data regarding the current content position from one or more user devices and save the data in the accounts data store 206. In some embodiments, the position synchronization module 202 may convert the current content position into a format-agonistic content position by using data in the position cross-reference data store 208. The position synchronization module 202 may also provide current content position data to the user devices when a user connects to the content access management system 102 and requests a current content position in order to resume content consumption. If the current content position in the accounts data store 206 is format-specific, it may be converted for use with the format in which the user presently wishes to consume the content prior to transmission of the current content position to the user device.

Generally speaking, a current content position may refer to any information that reflects a current playback, reading, or other presentation position of a content item, or to any measurement of an amount of content consumed by a user. For example, a current content position of an audio book may be indicated by a timestamp, a counter, a chapter, a last spoken word, etc., or any combination thereof. A current content position of an electronic book may be indicated by a page number, embedded position indicator, last word highlighted or made visible on the display, etc. A current position of a printed book may be indicated by a page number, line number, vertical position on the page, etc. In some embodiments, a current content position may be reflected as a percentage (e.g., a point representing 25% of the content has been consumed). In other embodiments, a current content position may be reflected as an absolute value (e.g., 2 hours, 30 minutes and 5 seconds into an audio book or 13,595 words into an electronic book). A current content position may be reflected by any combination of the above information, or any additional information reflective of current consumption position within a content item. In some embodiments, data regarding the current content position may reflect the play position at which a device has stopped presenting content or will stop presenting the content. If a user device is playing back streaming content from another system, the position synchronization module 202 optionally obtains the current content position from the system streaming the content. One example of a system for maintaining current content positions of client devices is disclosed in U.S. patent application Ser. No. 12/273,473, filed on Nov. 18, 2008 and titled SYNCHRONIZATION OF DIGITAL CONTENT, the contents of which are hereby incorporated by reference.

The content interaction module 204 may receive comments, highlights, annotations and other content interactions; store data regarding the content interactions in the content interactions data store 210; distribute the communications to one or more user devices in response to a subsequent request by the user; and the like. Upon receipt of data from the content interaction module 204, user devices may display, play, or otherwise present the content interactions or indications that content interactions are available. User devices with visual displays (e.g., tablet computers; electronic book readers) may be provided with visual representations of the content interactions. For example, recorded audio of user comments may be converted to text using speech recognition components. The content interaction module 204 may provide user devices that include audio output components (e.g., personal audio players) with aural representations of content interactions. For example, textual comments may be converted to audio format using text-to-speech components.

In some embodiments, multiple users may be associated with an account or permitted to access the account. For example, a group of users, such as students in a class, may share a content position and a common set of content interactions. The uses may each access the account from a single device or from separate devices. The users can contribute comments, highlight passages and the like, and such content interactions can also be made available to other users of the group. In some embodiments, rather than share a single account, multiple users with individual accounts may share content interactions regarding a particular content item with each other. In such cases, the users need not share access to a single account.

Example Electronic Bookmark

Figure 2A:
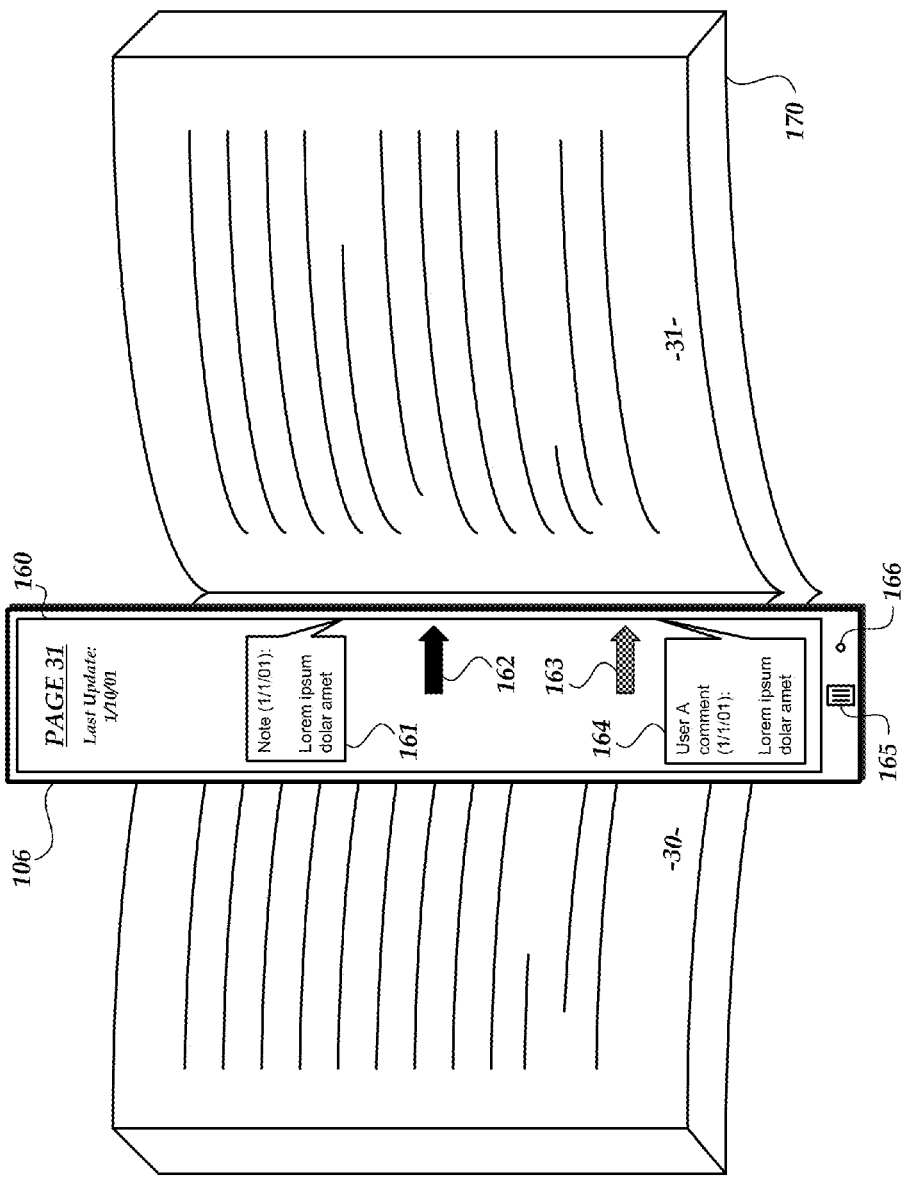
FIG. 2A is a diagram of an illustrative device for presenting content positions, comments, annotations and other related data to a reader of a printed book.

Turning now to FIGS. 2A, 2B, 2C and 2D, an illustrative electronic bookmark will be described. With reference to FIG. 2A, an electronic bookmark 106 may include a display 160 to present data regarding the current content position 162, comments and annotations 161, 164; highlights 163; and other content interactions. For example, the display 160 may be a liquid crystal display (LCD) or an electronic paper display (EPD). In addition, the electronic bookmark 106 may also include a speaker 165 and a microphone 166. The speaker 165 may be used to aurally present information, such as the current content position and recorded comments. The microphone 166 may be used to issue voice commands and to record comments. In some embodiments, the electronic bookmark 106 may not have a display, but rather may present and receive data through the speaker 165 and microphone 166 or some other input or output device. Although not shown, the electronic bookmark 106 may also include other hardware components, such as a processor, memory, a power supply, and a network communication antenna, as well as an operating system to manage the hardware components, application software modules to implement the features described herein and the like.

In operation, the electronic bookmark 106 may connect to a network, such as the internet, and retrieve data from the content access management system 102 regarding the content item to be consumed. For example, a user may speak a voice command into the microphone 166. The voice command may indicate which printed book version of the content item the user would like to read, as well as user account information. The voice command, or data derived from the voice command, may be transmitted over the communication network 120 to the content access management system 102. The content access management system 102 may authenticate and authorize the user, retrieve the current content position for the content item, convert the content position into a page number or some other position indicator for use with the printed book version, and return the information to the electronic bookmark 106 via the communication network 120. The electronic bookmark 106 may display the current content position on the display 160, as shown in FIG. 2A. The current content position may include a page number, as seen near the top of the display 160, and also a vertical page position indicator 162. When the user turns to the proper page in the printed book version of the content and positions the electronic bookmark 106 on or next to the indicated page, the user may locate the current content position by identifying the line corresponding to the vertical page position indicator 162. For example, the vertical page position indicator 162 may provide an accurate or estimated vertical position within the page when the electronic bookmark 106 is aligned with the bottom of the page, the top of the page, centered on the page, or placed in a predetermined position with respect to the page of the printed book version of the content. In some embodiments, such as those with a limited display 160 or without a display 160, the current content position may be presented to the user aurally via a speaker 165, instead of or in addition to a visual presentation on a display 160.

Figure 2B:
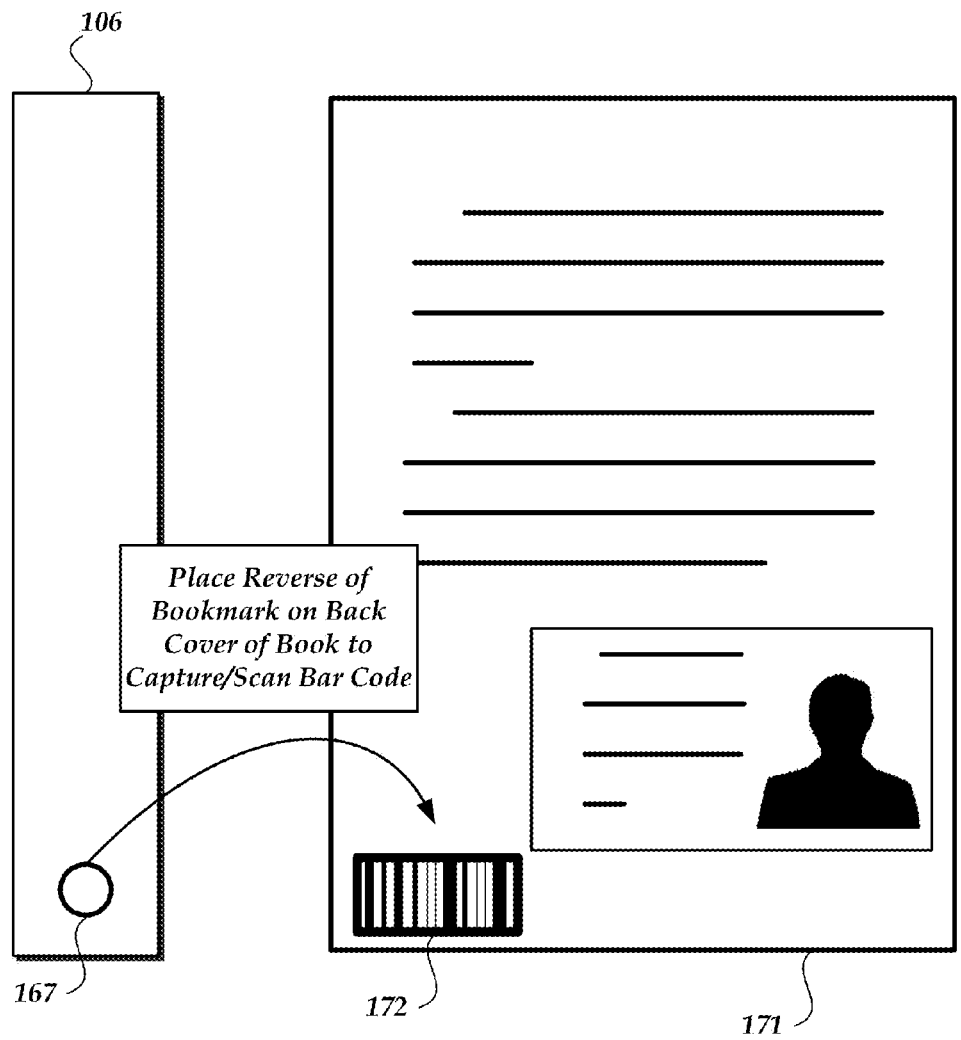
FIG. 2B is a diagram of the reverse of the illustrative device of FIG. 2A showing the capture of an indicator of the current printed book.

As described above, some content items, such as *The Adventures of Tom Sawyer*, may have more than one printed book version. Therefore, a means for inputting a unique identifier of the printed book version that the user wishes to read is desirable. In some embodiments, a user may submit a printed book version indicator through a picture or a scan of the barcode or international standard book number (ISBN) instead of using a voice command. As seen in FIG. 2B, the electronic bookmark 106 may include a camera 167. The camera 167 may be used to take a picture or scan of a barcode 172, typically corresponding to an ISBN and located on the back cover 171 of printed book versions of content. Alternatively, the camera 167 may be used to capture an image of the title page of the book, the front cover of the book, or to otherwise capture an image that may be used to identify the printed book version. In additional embodiments, the electronic bookmark may provide other input devices that the user may use to input the ISBN or some other identifier of the printed book version instead of or in addition to using a voice command or a camera image. For example, the electronic bookmark 106 may include a barcode scanner, a touch screen input, a full or partial keyboard input (e.g., a numeric keypad) and the like.

Returning to FIG. 2A, an electronic bookmark 106 may also receive data regarding content interactions from the content access management system 102. For example, comments and highlights that the user has entered on an electronic book reader may be saved at the content access management system 102 in the content interactions data store 210 and transmitted to the electronic bookmark 106 along with or separately from the current content position. The display 160 may be used to visually present comments, for example as information balloons 161, 164 that may also point to or otherwise indicate the portion of the page to which the comment applies. As shown in FIG. 2A, comments from other users, such as those in the user's social network, or those which are considered to be popular or representative of comments from a number of different users, may also be presented. Information balloon 164 illustrates one example of such a comment. In addition, the user may have highlighted a passage of the content while reading the content on a tablet computer or some other device. While such highlights may not be presented on the page 170 of the printed book version itself, a highlight indicator 163 may be presented on the display 160, such as an arrow pointing to the portion of the page that has been highlighted. In some embodiments, the text of the highlighted passage may be presented on the display 160 instead of or in addition to a highlight indicator 163.

A user may also wish to highlight text of the printed book version, make comments, and have those highlights, comments and other content interactions available if the user subsequently resumes content consumption on anther device, such as an electronic book reader. The user may speak voice commands into the microphone 166 regarding the content interaction, such as "highlight page 31 line 3," "highlight" followed by the passage to be highlighted, "add comment to page 31 line 3" followed by the comment to be added, etc.

Figure 2C:
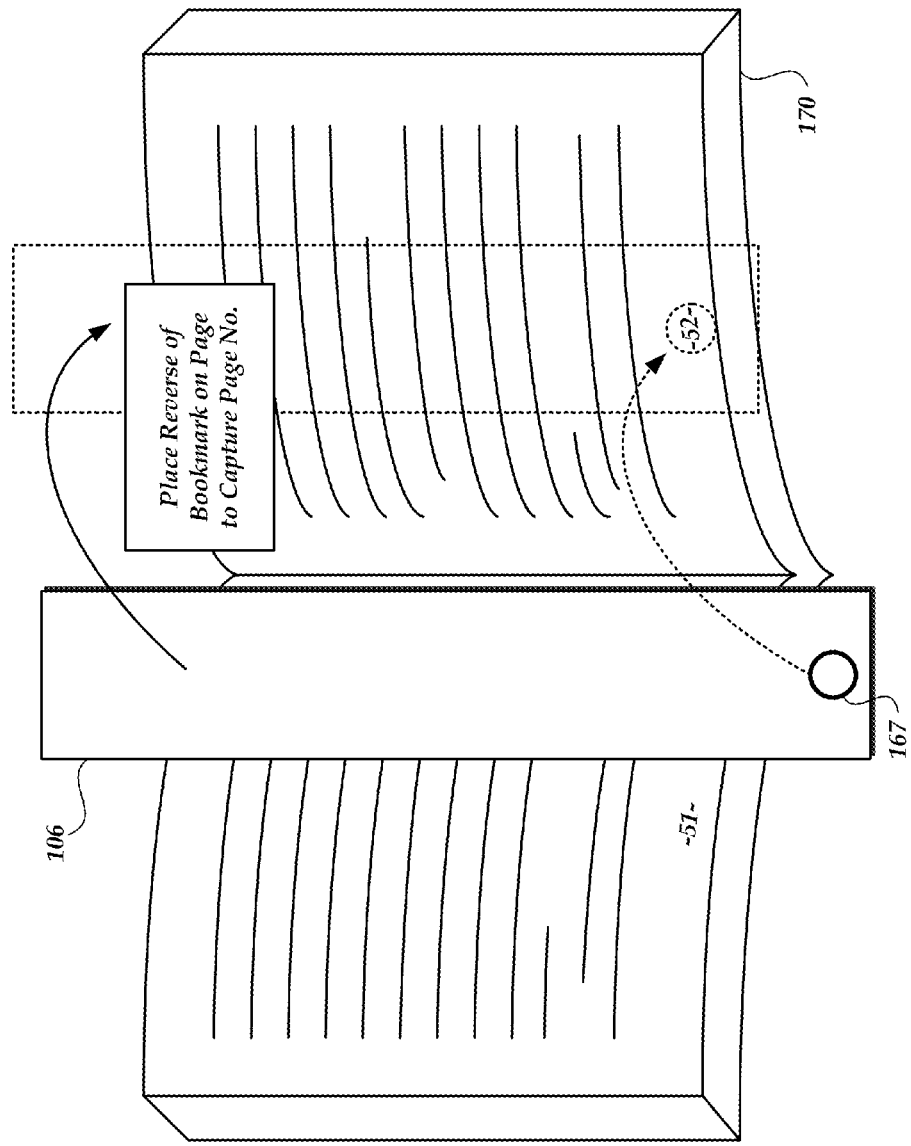
FIG. 2C is a diagram of the reverse of the illustrative device of FIG. 2A showing the capture of the current content position.

In some embodiments, the user may use the camera 167 to indicate the current page of the printed book version instead of the using a voice command. As seen in FIG. 2C, the user may place the camera 167 over the page number in order to capture an image of the page. For example, the camera 167 may include a macro lens for close up image capture of the page number such that the electronic bookmark 160 may be placed directly on the page with the camera 167 over the page number for ease of use. The user may then add a comment, highlight, or some other content interaction to the page for transmission to the content access management system 102. As described above, the highlight or content may be added through a voice command. Alternatively, content interactions may be added through a touch screen display or keyed display, similar to entry of the printed book version identifier described above. As seen in FIG. 2D, the user 168 may touch a touch screen display 160 to indicate the vertical position 169 of a passage to be highlighted or to be associated with a spoken or typed comment. Data regarding the content interaction, including the content position and any text associated with the content interaction, may be transmitted to the content access management system 102 via the communication network 120.

When the user wishes to stop reading the printed book version, methods similar to those described above for submitting content interactions may be used to submit the current page position to the content access management system 102. For example, the user may issue a voice command, capture an image of the page number, use a touch screen display to enter a page number or identify a vertical page position, etc.

Other Embodiments

Figure 3A:
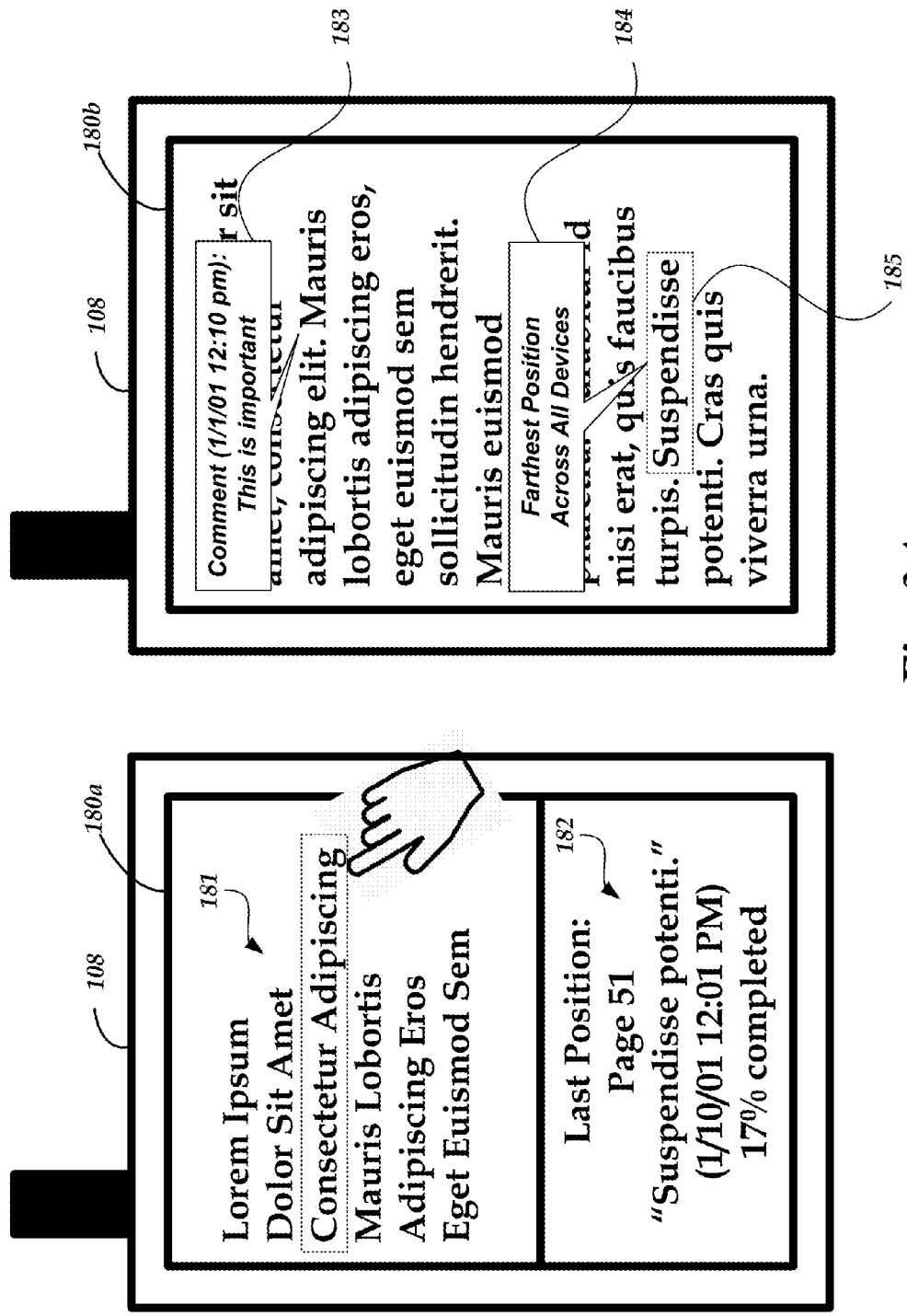
FIG. 3A is a user interface diagram of two illustrative mobile computing device interfaces for obtaining content consumption information.
Figure 3B:
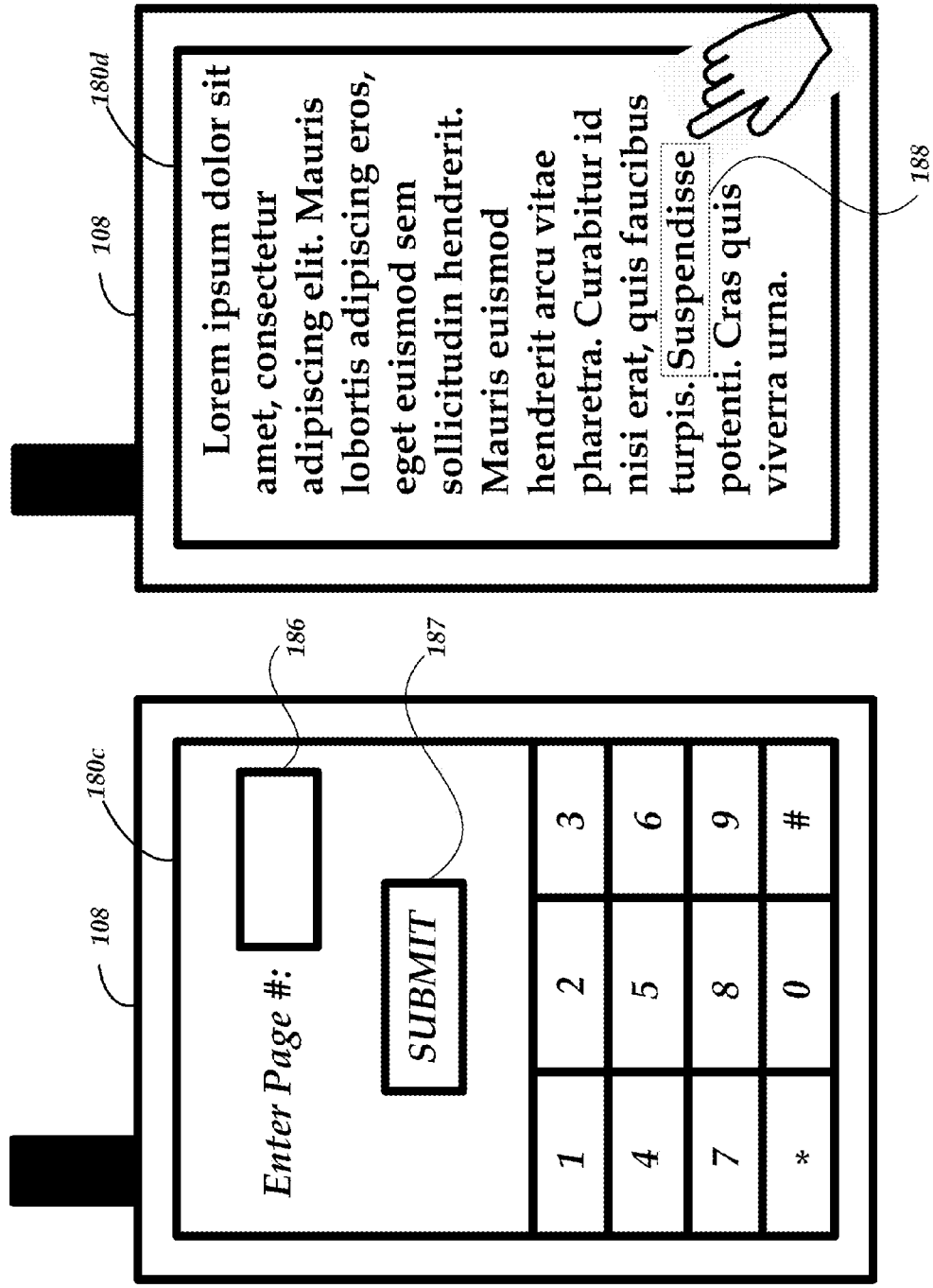
FIG. 3B is a user interface diagram of two illustrative mobile computing device interfaces for indicating and submitting content consumption information.
Figure 3C:
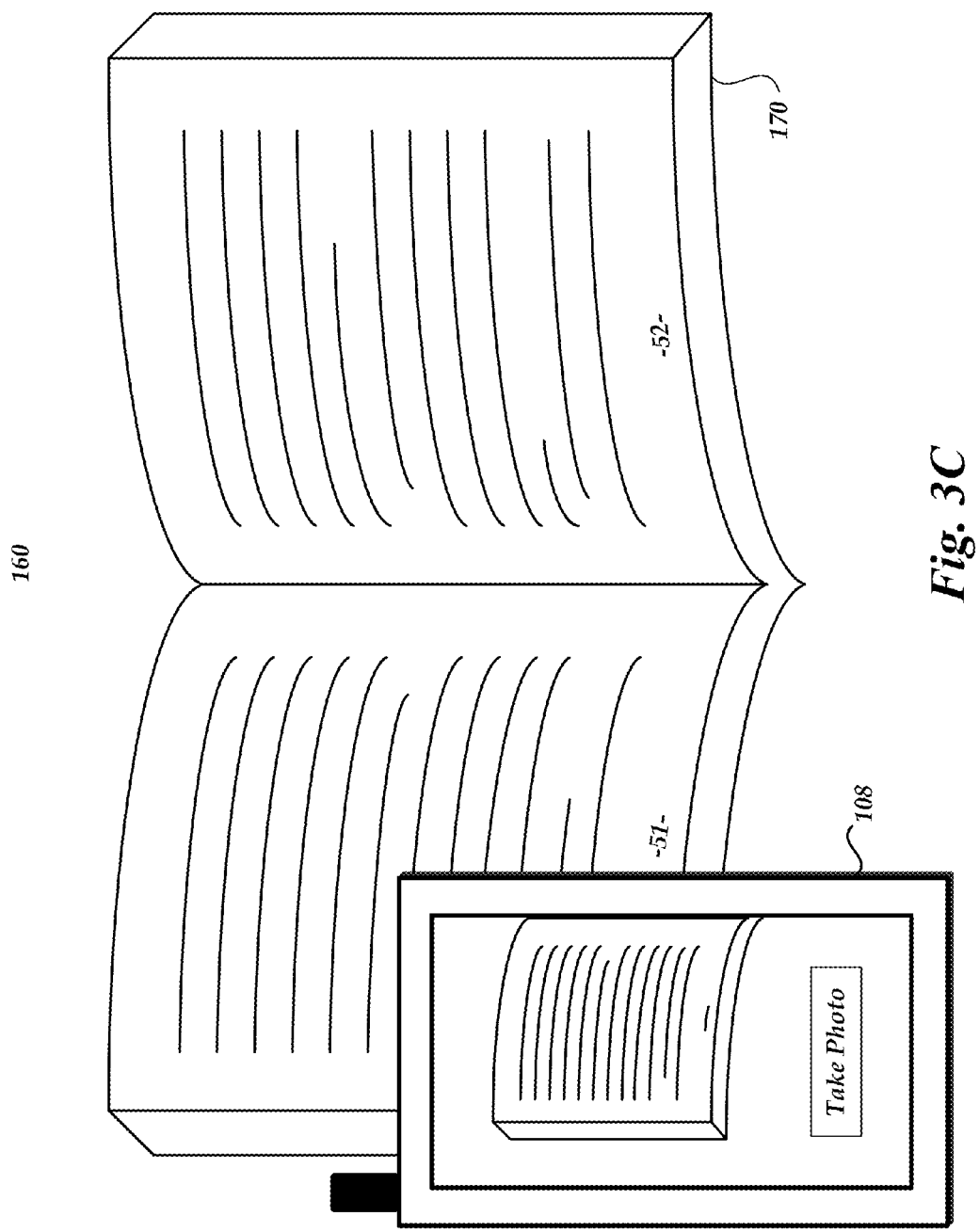
FIG. 3C is a diagram of an illustrative mobile computing device showing the capture of the current content position.

The features described above, among others, may optionally be provided via devices other than electronic bookmarks 106. For example, mobile phones, personal media players, portable gaming systems, PDAs and the like may be programmed to provide current content positions and content interactions from a content access management system 102 to a user for use when reading a printed version of content, and for submitting current content positions and content interactions to the content access management system 102 for use when consuming other versions of the content. FIGS. 3A, 3B and 3C illustrate one such embodiment.

As seen in FIG. 3A, a mobile phone 108 may present a user interface 108a for selecting a content item to consume. For example, a user may use the mobile phone 108 to submit user account authentication data to the content access management system 102. The authentication information may be provided via a voice command or it may be keyed in through a touch screen display or a keypad. The content access management system 102 may return data to the mobile phone 108 indicating one or more content items that have content positions associated with the user or which the user may otherwise access. The user interface 108a may display a content list 181 of the content items to the user, and the user may select a content item from the list 181. Information about the content items may be displayed to the user in the list 181, in a content information area 182 or in some other manner. The information may include the current content position converted into a page number for use when reading a printed version of the content item, a passage of the content that the user may use to locate the current content position on the indicated page and other data. In addition, the mobile phone 108 or other device may present information about highlights, comments and other content interactions. For example, a user interface 180b may be presented to the user with a portion of the content item and indicators corresponding to various content interactions. Information balloons or other indicators may be used to present comments 183 or information 184 about the current content position 185. The current content position 185 may be highlighted, outlined, underlined, presented in a different color or font, or otherwise presented so as to be more easily located by the user. Similar methods may be used to present highlights or other content interactions to the user.

FIG. 3B illustrates a user interface 180c that may be presented to a user in order to input a current content position. The interface 180c may be used in conjunction with another user interface, such as the user interface 180d, in order to further indicate a specific passage associated with the current content position, or to add a comment, highlight or other content interaction. For example, the user may input a page number 186 and submit the page number to the content access management system 102 to be saved or converted into a format-agnostic content position. In addition, the user may indicate a word or passage 188 on the same user interface or a separate user interface 180d to be used when saving or converting the current content position. In some embodiments, a user may submit current content positions and content interactions through the use of voice commands in a manner similar to the electronic bookmark embodiments described above.

In some embodiments, the user may capture a picture of the current content page or a portion thereof to submit as a current content position either by itself or in conjunction with data regarding a content interaction. FIG. 3C illustrates the use of a mobile phone 108 configured with a camera capturing an image/picture of a content item 170. The mobile phone 108 may utilize optical character recognition (OCR) to determine the text corresponding to the image, and may transmit the text to the content access management system 102 for use when saving or converting the current content position. In some embodiments, the mobile phone 108 may utilize OCR to determine the page number. In some embodiments, the mobile phone 108 may determine the current content position through the use of OCR and data regarding the content item 170 in order to submit the current content position to the content access management system 102 rather than submitting a picture or portion of the content item itself.

Content Position and Content Interaction Transfer Processes

Figure 4:
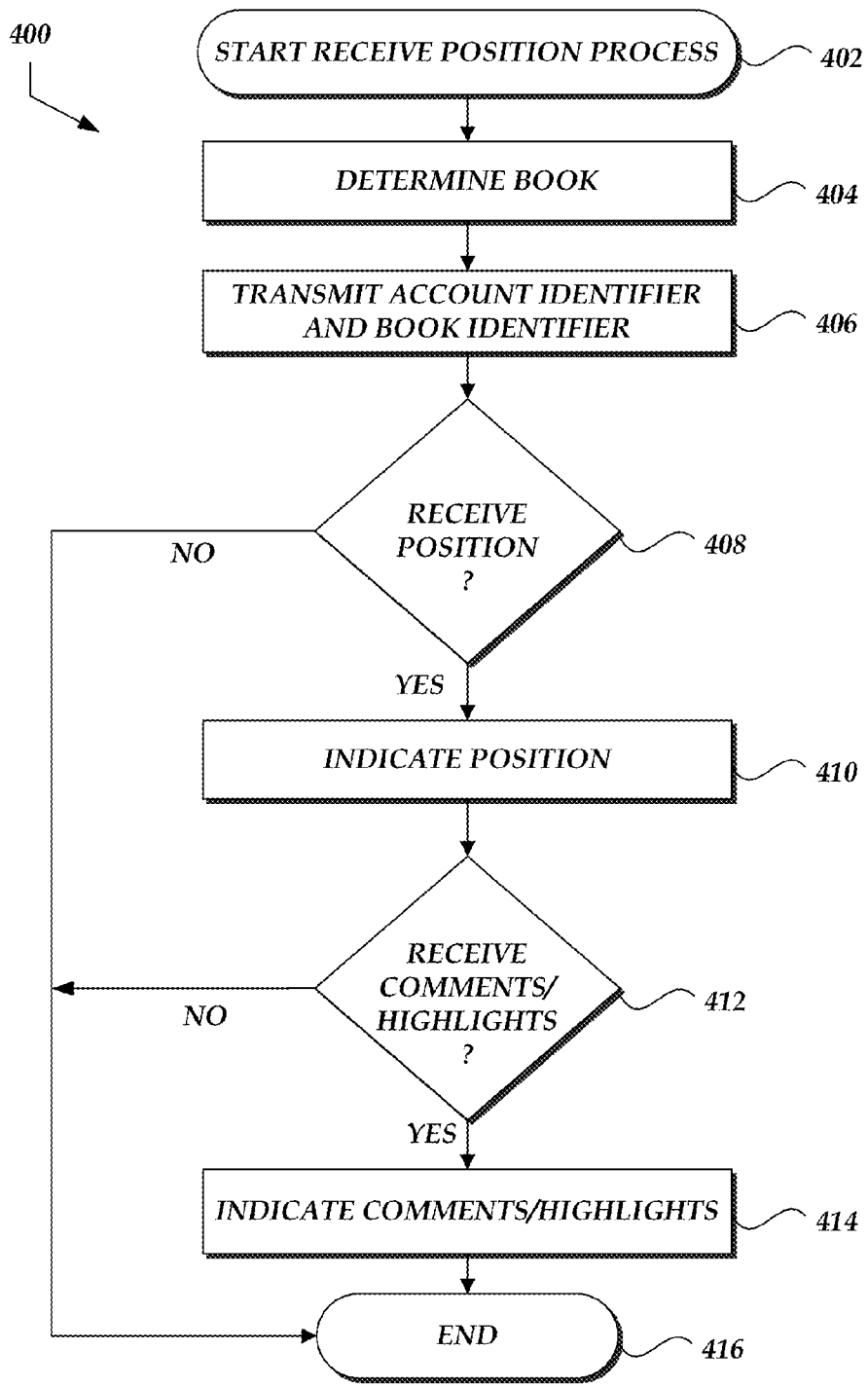
FIG. 4 is a flow diagram of an illustrative process for obtaining content consumption information.

FIG. 4 illustrates a sample process 400 for obtaining a current content position for use when reading a printed version of a content item. While the description of the process 400 which follows focuses on an electronic bookmark implementation, other user devices may also be configured to perform the process 400 or a variant thereof for obtaining and presenting current content positions and content interactions. The process 400 can be implemented as a software module or collection of modules residing within non-transitory computer storage, such as RAM, ROM, a hard disk, or the like, of an electronic bookmark or other user device. One or more processors of the user device can execute the software module.

The process 400 begins at block 402. The process 400 may be instantiated upon device power up, or in response to a command entered or otherwise provided by a user. For example, a user may wish to read a printed version of *The Adventures of Tom Sawyer*, and may wish to resume from the position at which the user left off when reading an ebook version or listening to an audio book version. The user may power on an electronic bookmark and initiate the process 400.

At block 404, the user may identify the printed version of the content that is to be consumed. As described above, this may include scanning a barcode on the cover of a printed book, speaking a voice command, keying in an ISBN, or otherwise inputting an identifier of the printed version into the electronic bookmark or other user device. In some embodiments, identifying a printed version of a content item may include selecting a content item from a list of available content items.

At block 406, the electronic bookmark may transmit account authentication information and a book identifier to the content access management system 102. As described above, the account information may be provided through the use of voice commands, keyed entry, or other manual techniques. In some embodiments, an identifier of the electronic bookmark or other user device may be provided to the content access management system 102. The content access management system 102 may then determine a user account associated with the user device.

At decision block 408, the electronic bookmark may wait for a current content position to be received from the content access management system 102. If a current content position is received, the process 400 may proceed to block 410. Otherwise, if no current content position is received, the process may proceed to block 416, where the process 400 terminates. Optionally, the process may return to block 406 or some earlier block to retry the current content position retrieval operation if no current content position is received at decision block 408.

At block 410, the electronic bookmark may present or otherwise indicate the current content position to the user. As described above, presentation of the current content position may include displaying a page number and/or a passage on a display. In embodiments utilizing user devices with large displays, such as some mobile phones, an image of the current page or a large amount of text corresponding to a substantial portion of the current page may be presented, and a word, sentence or passage correspond the current content position may be indicated to the user through the use of various visual treatments (e.g., highlights, underlines). In some embodiments, the current content position may be presented aurally through a speaker.

At decision block 412, the electronic bookmark may determine whether highlights, comments, or data regarding other content interactions has been received from the content access management system 102. If data regarding content interactions is received, it may be presented to the user at block 414. For example, data regarding content interactions may be received concurrently with the current content position, or such data may be received at a different time. The content interaction data may include content position data corresponding to each content interaction, and a text or audio representation of the content interaction. The electronic bookmark may then display an indication corresponding to one or more content interactions that correspond to content positions on the same page that user is currently reading, or are substantially close to the current content position that was received as described above. Content interactions that correspond to prior or subsequent pages may be presented when the user updates the current content position, when the electronic bookmark detects that the user has turned the page, or in response to another event.

Figure 5:
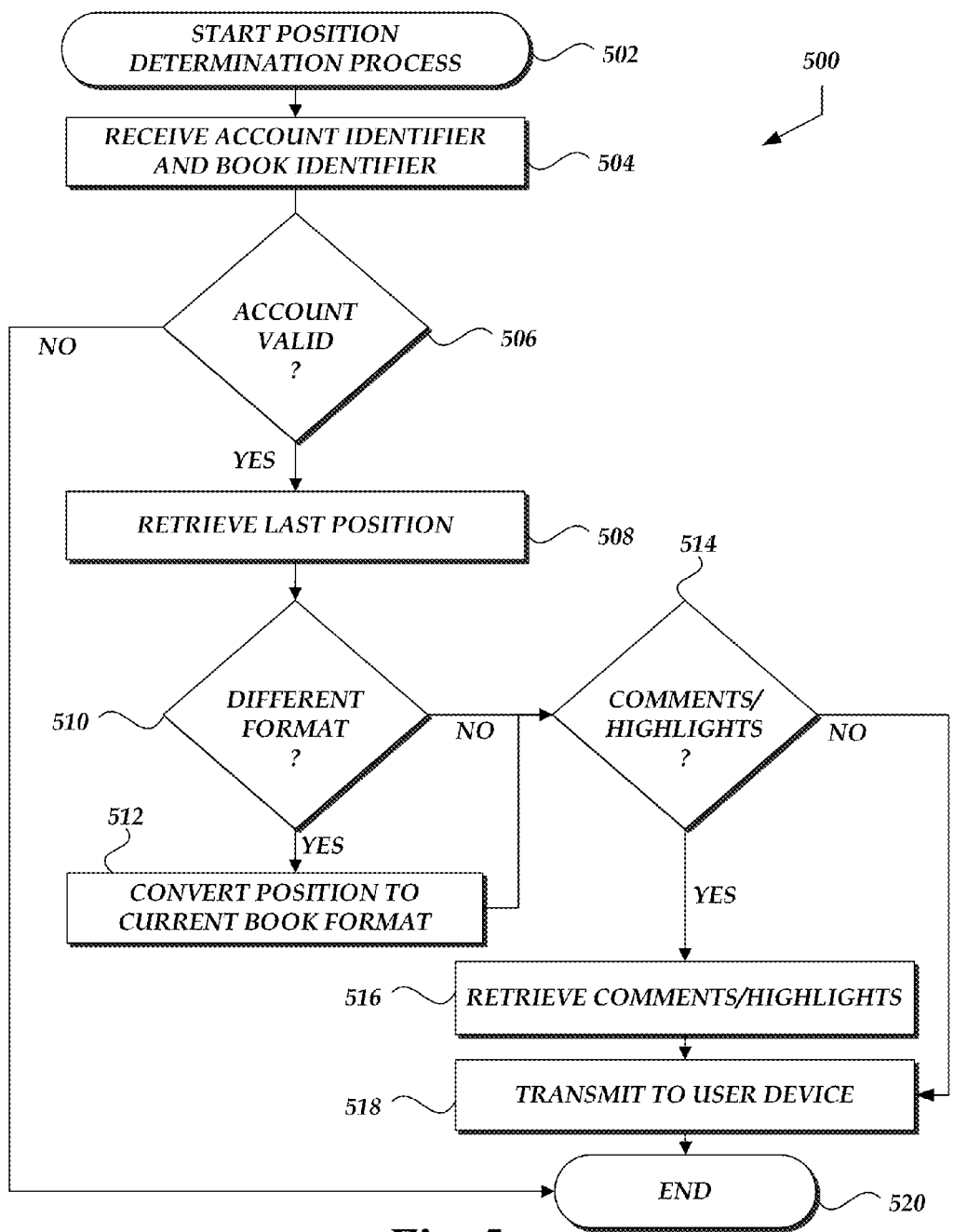
FIG. 5 is a flow diagram of an illustrative process for retrieving and optionally converting content consumption information.

FIG. 5 illustrates a sample process 500 for determining a current content position and otherwise responding to a request received from a user device such as an electronic bookmark, for content consumption data corresponding to a particular content item. While the description of the process 500 which follows focuses an implementation by a content access management system 102, the other systems and devices may also be configured to perform the process 500 or a variant thereof. The process 500 can be implemented as a software module or collection of modules residing within non-transitory computer storage, such as RAM, ROM, a hard disk, or the like, of a content access management system 102. One or more processors of the content access management system 102 or a computing device associated therewith can execute the software module.

The process 500 begins at block 502. At block 504, the content access management system 102 may receive an account identifier and a content identifier from a user device. The account identifier may include a username and password, an account number, a device identifier or some other identifier. A content identifier may include a title, barcode, ISBN or some other identifier, as described above. For example, a user may wish to read a printed version of *The Adventures of Tom Sawyer*, and may wish to resume from the position at which the user left off when reading an ebook version or listening to an audio book version. The user may power on an electronic bookmark and submit a username, a password and an ISBN corresponding to the particular printed version of *The Adventures of Tom Sawyer* that the user wishes to read. The data may be transmitted to, and received by, the content access management system 102 in a single communication transaction, or in separate transactions.

At decision block 506, the content access management system 102 may determine whether the user's account is valid. Returning to the example above, the content access management system 102 may verify that the username exists in the accounts data store 206, and that the password matches the password in the accounts data store 206 corresponding to the username. In addition, the content access management system 102 may verify other account-related information, such as payment status, service agreements and the like. If the account is determined to be valid, the process 500 may proceed to block 508. Otherwise, the process 500 may terminate at block 520.

At block 508, the content access management system 102 may retrieve the last known content position for the content identified in the initial request from the user. For example, the last known current content position may be stored in the accounts data store 206 or some other data store associated with the content access management system 102.

At decision block 510, the position synchronization module 202 or some other module or component of the content access management system 102 may determine whether the last known current content position corresponds to a different content version or format than the printed book for which the user is currently requesting the current content position. For example, if the last known current content position was stored in a format-agnostic manner, or stored in a specific format such as the elapsed time of an audio book, the position synchronization module 202 can convert the current position to a page number or a more specific content position at block 512. The position synchronization module 202 may consult a content position cross-reference data store 208, or some other module or component in order to convert the current position into a format that will be usable with a printed book version.

In some cases, portions of a printed representation may not correspond to portions of an electronic representation. For example, a printed book may refer to the "reader" and to "reading," while an audio book version of the same book may refer to a "listener" and to "listening." In such cases, most of the remaining content in the printed book corresponds to content in the audio book. Any gaps can be linked such that the positions of references to the "reader" in the printed book correspond to the positions of references to the "listener" in the audio book. In other cases, larger portions of content may be different, such as when a book is available in different editions, different languages or in abridged and unabridged versions. For example, a new edition of a book may have an additional chapter that an older edition does not. A user may begin consuming the book via an audio book version of the new edition, and may stop listening at some point during the new chapter. Later, the user may wish to read a printed version of the book, but may only have access to the older edition. In such cases, the conversion of the position from the audio book to the printed book version may choose the last position in the audio book that corresponds to a position in the printed book (e.g., before the new chapter) or the next position in the audio book that corresponds to a position in the printed book (e.g., after the new chapter). In some embodiments, an option may be presented to the user to choose whether to use the last corresponding position or the next corresponding position.

At decision block 514, the content interaction module 204 or some other module or component of the content access management system 102 may determine whether there are comments, highlights, or other content interactions associated with the content item that are to be sent to the user. Such content interactions may be the user's own interactions, or they may be entered or shared by other users. If the content interaction module 204 determines that content interactions are available, data regarding the content interactions may be retrieved at block 516. As described above, the content interaction data may include one or more content positions corresponding to the portion of the content to which the interaction applies. The content interaction data may also include text or audio presentations of comments or annotations.

At block 518, data may be transmitted to the user device. The data may include a current content position, converted for use with the printed version of the content item that the user wishes to read. The data may also include data regarding content interactions. After the transmission of data to the user device, the process 500 may terminate at block 520.

Figure 6:
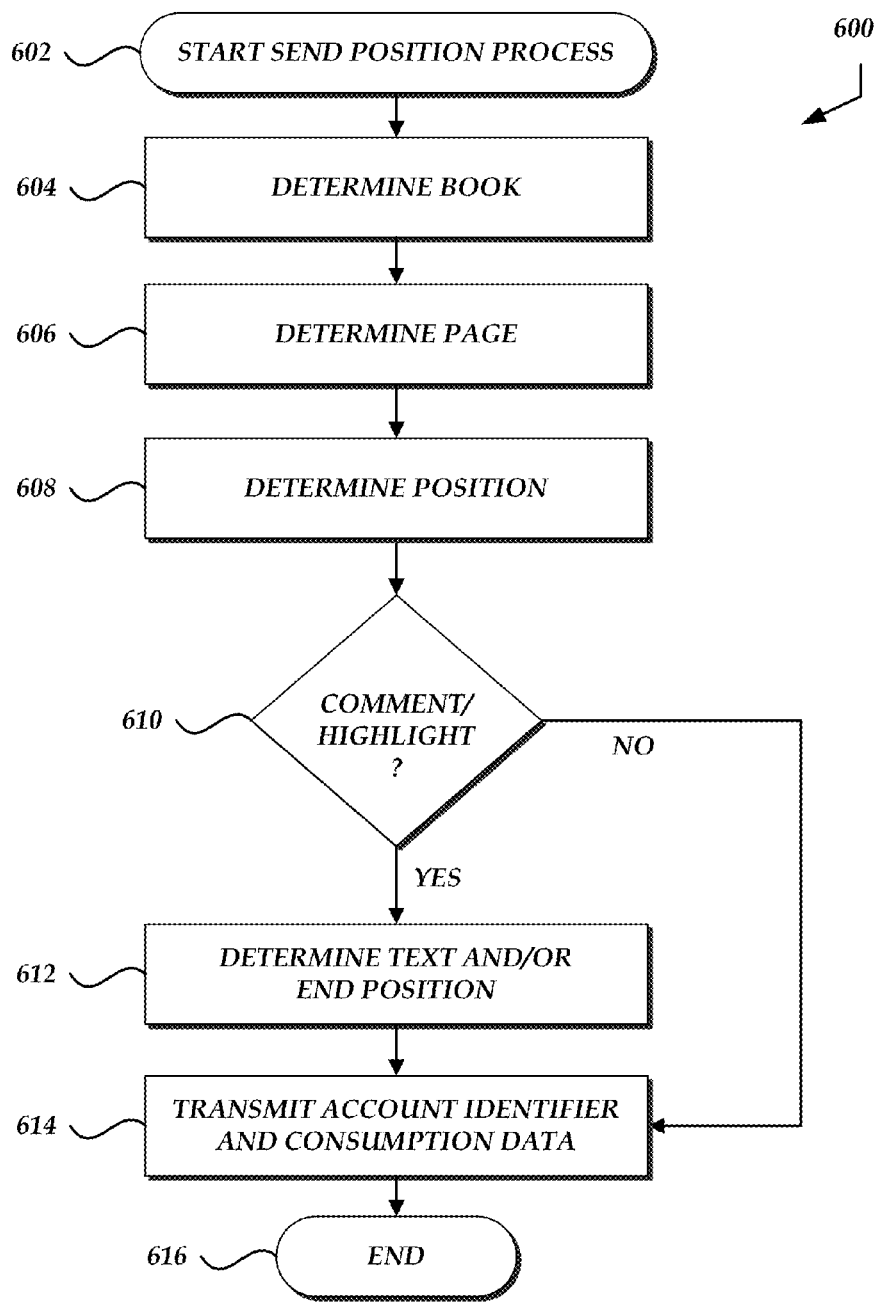
FIG. 6 is a flow diagram of an illustrative process for submitting content consumption information.

FIG. 6 illustrates a sample process 600 for updating the current content position and any new content interactions during a reading session or after a reading session. While the description of the process 600 which follows focuses on an electronic bookmark implementation, other user devices may also be configured to perform the process 600 or a variant thereof. The process 600 can be implemented as a software module or collection of modules residing within non-transitory computer storage, such as RAM, ROM, a hard disk or the like, of an electronic bookmark or other user device. One or more processors of the user device can execute the software module.

The process 600 begins at block 602. The process 600 may be executed at various times through a reading session, such as on a regular or irregular schedule, or in response to certain events such as the addition of a comment. The process 600 may also be executed at the end of a reading session. For example, a user may be reading a printed book version of *The Adventures of Tom Sawyer*, and may wish to stop reading. The user may wish to save the current content position for use with the user resumes consuming *The Adventures of Tom Sawyer*, either as a printed book version or as an electronic version, such as an ebook or audio book.

At block 604, an electronic bookmark or other user device may determine the specific version of the content item that the user is currently reading (e.g., the ISBN of a printed book). As described above, the determination may be made in conjunction with a scan or other capture of a barcode on the cover of the book, a voice command, or some other entry of an identifier associated with the printed version. For example, the user may have begun reading a printed book from the first page, without any communication with a content access management system 102. The user may wish to stop and save the current content position in order to resume consumption with a different format, or with the same printed version. The user may scan the barcode associated with the printed book in order to identify the book to the electronic bookmark and the content access management system 102. As another example, the user may have resumed content consumption by retrieving a current content position via the electronic bookmark, and therefore the electronic bookmark may already have access to an identifier for the printed version of the content item from the initial retrieval of the current content position.

At block 606, the electronic bookmark may determine the page at which the user has stopped reading. As described above, the user may identify the page by keying in text, speaking a voice command or capturing an image of the page number. At block 608, the electronic bookmark can determine the position on the page at which the user stopped reading. The user may identify the position by keying in text of the passage at which the user stopped reading, speaking a voice command, capturing an image of the passage or selecting a vertical position of the page by tapping on a touch screen display.

At decision block 610, the electronic bookmark may determine whether any comments, highlights or other content interactions have been added or modified during the reading session. If so, the electronic bookmark may determine a content position for each content interaction at block 612, and create data regarding the content interaction, such as a voice recording, a textual input, speech recognition conversion of a voice recording into text, a stop position for a highlight and the like. Similarly, the electronic bookmark or content access management system 102 may determine whether any other material exists that includes references to the content position associated with the reading session.

At block 614, the electronic bookmark may transmit an account identifier (e.g., a username or account number) and the consumption data (e.g., the current content position and data regarding content interactions) to the content access management system 102. The content access management system 102 may save the data in various data stores, convert content positions into format-agnostic versions and the like. At block 616, the process 600 may terminate. As described above, if the process 600 is executed on a schedule or in response to an event other than the end of a reading session, the process 600 may be repeated as many times as necessary in a single reading session.

In some embodiments, user devices may submit content position data automatically, such as upon initialization of a process to add or modify a content interaction. In some embodiments, the user device may establish a network connection with the content access management system 102, and the content access management system 102 may request the current content position. In some embodiments, the user may manually submit the current content position to the content access management system 102.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A device for managing content consumption, the device comprising:
    an image sensor configured to record images;
    a data store configured to store computer-executable instructions; and
    a processor in communication with the data store and the image sensor, wherein the processor, when executing the computer-executable instructions, is configured to at least:
        receive, from a user of the device, an instruction to record an image of a book identifier located on a physical version of a book;
        cause the image sensor to record the image of the book identifier located on the physical version of the book;
        transmit the book identifier and a user identifier to a content access management system, wherein the user identifier identifies the user;
        receive, from the content access management system, data regarding a location within the physical version of the book where the user may resume reading and content annotation data regarding one or more previously-saved annotations made by the user during consumption of an electronic version of the book,
            wherein the electronic version of the book corresponds to the physical version of the book,
            wherein the location within the physical version of the book where the user may resume reading is determined based at least in part on a previously-saved location within the corresponding electronic version of the book where the user ceased reading, wherein the corresponding electronic version of the book is identified by the content access management system using the transmitted book identifier, and wherein the previously-saved location within the corresponding electronic version of the book is obtained by the content access management system using the user identifier; and present, to the user, data regarding the location within the physical version of the book where the user may resume reading and the content annotation data.

2. The device of claim 1, wherein the location within the physical version of the book where the user may resume reading relates to at least one of a page number of the physical version of the book, a location on a page of the physical version of the book or a portion of the physical version of the book.

3. The device of claim 1, wherein the location within the physical version of the book where the user may resume reading is presented to the user via at least one of a visual display or an audio output.

4. The device of claim 1, wherein the processor, when executing the computer-executable instructions, is further configured to at least:

cause the image sensor to record an image of a location identifier, wherein the location identifier identifies an updated location where the user ceased reading within the physical version of the book; and transmit updated location data regarding the updated location where the user ceased reading within the physical version of the book to the content access management system.

5. A system for managing content consumption, the system comprising:

a data store configured to store computer-executable instructions; and a computing device in communication with the data store, the computing device, when executing the computer-executable instructions, configured to at least:

receive, from a user, an instruction to record an image of a content item identifier located on a physical version of the content item;

cause an image sensor to record the image of the content item identifier located on the physical version of the content item;

transmit an account identifier and the content identifier to a content access management system, wherein the account identifier identifies an account associated with the user of the computing device;

receive, from the content access management system, data regarding a location within the physical version of the content item where the user may resume reading, wherein the location within the physical version of the content item where the user may resume reading corresponds to a location previously reached by the user in an electronic version of the content item, and wherein the electronic version of the content item is identified by the content access management system using the transmitted content identifier, and wherein the corresponding location previously reached by the user in the electronic version of the content item is obtained by the content access management system using the account identifier;

receive, from the content access management system, content annotation data regarding one or more previously-saved annotations made by the user during consumption of the electronic version of the content item, wherein the content access management system retrieves the content annotation data using the account identifier; and present, to the user, data regarding the location within the physical version of the content item where the user may resume reading and at least a portion of the content annotation data.

6. The system of claim 5, wherein the location within the physical version of the content item where the user may resume reading relates to at least one of a page number of the physical version of the content item, a location on a page of the physical version of the content item or a portion of the physical version of the content item.

7. The system of claim 5, wherein the content annotation data relates to at least one of a comment associated with a portion of the content item or a highlight associated with a portion of the content item.

8. The system of claim 5, wherein the location within the physical version of the content item where the user may resume reading and the portion of the content annotation data are visually displayed to the user.

9. The system of claim 5, wherein the location within the physical version of the content item where the user may resume reading and the portion of the content annotation data are aurally presented to the user.

10. A computer-implemented method for managing content consumption, the computer-implemented method comprising:

under control of a computing device configured with specific computer-executable instructions, obtaining a version identifier associated with a physical version of a content item by causing an image sensor to record an image of the version identifier located on the physical version of the content item, wherein the content item is associated with an electronic version of the content item;

transmitting the version identifier and an account identifier to a content access management system, wherein the account identifier is associated with a user;

receiving, from the content access management system, data regarding a location within the physical version of a content item where the user may resume reading and content annotation data regarding one or more previously-saved annotations made by the user during consumption of the electronic version of the content item, wherein the location within the physical version of the content item where the user may resume reading is determined by the content access management system by at least:

using the version identifier to identify the electronic version of the content item; and using the account identifier to identify a location in the electronic version of the content item previously reached by the user; and presenting the location within the physical version of the content item where the user may resume reading and the content annotation data.

11. The computer-implemented method of claim 10, wherein the computing device comprises an electronic bookmark, mobile phone, media player or game player.

12. The computer-implemented method of claim 10, wherein multiple users are associated with the account identifier.

13. The computer-implemented method of claim 10, wherein the location within the physical version of the content item where the user may resume reading relates to at least one of a page number of the physical version of the content item, a location on a page of the physical version of the content item or a portion of the physical version of the content item.

14. The computer-implemented method of claim 10, wherein the location within the physical version of the content item where the user may resume reading comprises a location within electronic version of the content item that has been modified for use with the physical version of the content item.

15. The computer-implemented method of claim 10, wherein the location within the physical version of the content item where the user may resume reading is visually displayed to the user.

16. The computer-implemented method of claim 10, wherein the location within the physical version of the content item where the user may resume reading is aurally presented to the user.

17. The computer-implemented method of claim 10, wherein obtaining the version identifier comprises obtaining an image of a barcode associated with the physical version of the content item.

18. The computer-implemented method of claim 10, wherein obtaining the version identifier comprises receiving a text input, from the user, including at least one of the version identifier and data from which the version identifier can be determined.

19. The computer-implemented method of claim 10, wherein obtaining the version identifier comprises receiving a voice input, from the user, including the version identifier or data from which the version identifier can be determined.

20. The computer-implemented method of claim 10, wherein obtaining the version identifier comprises:
receiving the version identifier from the content access management system; and
receiving, from the user, a selection of the physical version of the content item associated with the version identifier.

21. The computer-implemented method of claim 10, wherein the account identifier comprises at least one of a user name associated with the user, an account number associated with the user and a device identifier associated with the one or more computing devices.

22. The computer-implemented method of claim 10, wherein the content annotation data relates to a comment associated with a portion of the content item or a highlight associated with a portion of the content item.

23. The computer-implemented method of claim 10, wherein the portion of the content annotation data is visually displayed to the user.

24. The computer-implemented method of claim 10, wherein the portion of the content annotation data is aurally presented to the user.

25. A non-transitory computer storage medium which stores a computer-executable module, said computer-executable module, when executed by one or more processors, being configured to:

receive, from a user, an instruction to record an image of a content item identifier located on a physical version of content item;

cause an image sensor to record the image of the content item identifier located on the physical version of the content item;

receive location data regarding a location reached by a user within the physical version of a content item, wherein the content item is associated with an electronic version of the content item, and wherein the location reached by the user within the physical version of the content item corresponds to a location in the electronic version of the content item at which the user may resume consuming the content item;

receive annotation data regarding an annotation to the physical version of the content item made by a user during consumption of the physical version of the content item, wherein the annotation is associated with a location within the physical version of the content item; and transmit an account identifier, the content identifier, and content consumption data to a content access management system, wherein the account identifier identifies an account associated with the user, wherein the content consumption data is based at least in part on the location data and the annotation data, wherein the content access management system is configured to identify the electronic version of the content item using the content identifier, and wherein the content access management system is further configured to determine the location within the electronic version of the content item based at least partly on the account identifier and the content consumption data.

26. The non-transitory computer storage medium of claim 25, wherein the location within the physical version of the content item relates to at least one of a page number of the physical version of the content item, a location on a page of the physical version of the content item or a portion of the physical version of the content item.

27. The non-transitory computer storage medium of claim 25, wherein the location data comprises an image of a page number.

28. The non-transitory computer storage medium of claim 27, wherein the computer-executable module is further configured to determine the location within the physical version of the content item based at least in part on output from an optical character recognition (OCR) operation performed on the image of the page number.

29. The non-transitory computer storage medium of claim 25, wherein the annotation data comprises at least one of a voice input, a text input and a touch screen input.

30. The non-transitory computer storage medium of claim 25, wherein the annotation data relates to at least one of a comment and a highlight associated with a portion of the physical version of the content item.

* * * * *